United States Patent
Kneezel et al.

(10) Patent No.: US 7,422,301 B2
(45) Date of Patent: Sep. 9, 2008

(54) METHOD AND APPARATUS USING PIXEL SPOT SIZE CONTROL FOR REDUCING INTERCOLOR BLEED

(75) Inventors: Gary A. Kneezel, Webster, NY (US); Thomas P. Courtney, Canandaigua, NY (US); Joseph F. Stephany, Williamson, NY (US); Richard V. LaDonna, Fairport, NY (US); Juan J. Becerra, Altamont, NY (US)

(73) Assignee: Xerox Corporation, Norwalk, CT (US)

( * ) Notice: Subject to any disclaimer, the term of this patent is extended or adjusted under 35 U.S.C. 154(b) by 310 days.

(21) Appl. No.: 11/033,369

(22) Filed: Jan. 10, 2005

(65) Prior Publication Data

US 2006/0152769 A1 Jul. 13, 2006

(51) Int. Cl.
*B41J 2/205* (2006.01)
*B41J 29/393* (2006.01)
(52) U.S. Cl. .......................................... 347/15; 347/19
(58) Field of Classification Search ...................... 347/5, 347/9, 12, 15, 19, 43
See application file for complete search history.

(56) References Cited

U.S. PATENT DOCUMENTS

| | | | |
|---|---|---|---|
| 5,107,276 A | 4/1992 | Kneezel et al. | |
| 6,084,604 A * | 7/2000 | Moriyama et al. | 347/15 |
| 6,161,919 A | 12/2000 | Klassen | |
| 6,183,062 B1 | 2/2001 | Curtis et al. | |
| 6,270,186 B1 | 8/2001 | Smith et al. | |
| 6,290,330 B1 * | 9/2001 | Torpey et al. | 347/43 |
| 6,361,144 B1 | 3/2002 | Torpey et al. | |
| 6,422,677 B1 | 7/2002 | Deshpande et al. | |
| 6,474,778 B1 * | 11/2002 | Koitabashi et al. | 347/43 |
| 2003/0043217 A1 * | 3/2003 | Yang et al. | 347/14 |
| 2003/0090539 A1 * | 5/2003 | Lahut et al. | 347/43 |

* cited by examiner

*Primary Examiner*—Lamson D. Nguyen
(74) *Attorney, Agent, or Firm*—Fay Sharpe LLP (57) ABSTRACT

A method and apparatus for reducing intercolor bleed using pixel spot size control to improve print quality is provided. The method includes printing pixels having a first spot size in an image region having a boundary between a first color portion and a second color portion of the image by ejecting first sized ink drops from the printhead nozzles, and printing border pixels having spot sizes smaller than the first spot size in the image region by ejecting smaller ink drops from the printhead nozzles, wherein the smaller ink drops are smaller than the first sized ink drops. A printing system is provided having means for printing pixels in the region having the first spot size and means for printing border pixels having spot sizes smaller than the first spot size.

21 Claims, 11 Drawing Sheets

METHOD AND APPARATUS USING PIXEL SPOT SIZE CONTROL FOR REDUCING INTERCOLOR BLEED

CROSS REFERENCE TO RELATED APPLICATIONS

This application is related to U.S. patent application to Torpey et al., Ser. No. 10/985,253 filed Nov. 10, 2004.

BACKGROUND

Illustrated herein are embodiments relating to a method and apparatus for reducing intercolor bleed to improve print quality. They find particular application in addressing intercolor bleed problems and will be described with particular reference thereto. However, it is to be appreciated that these embodiments are also amenable to other like applications.

Figure 1:
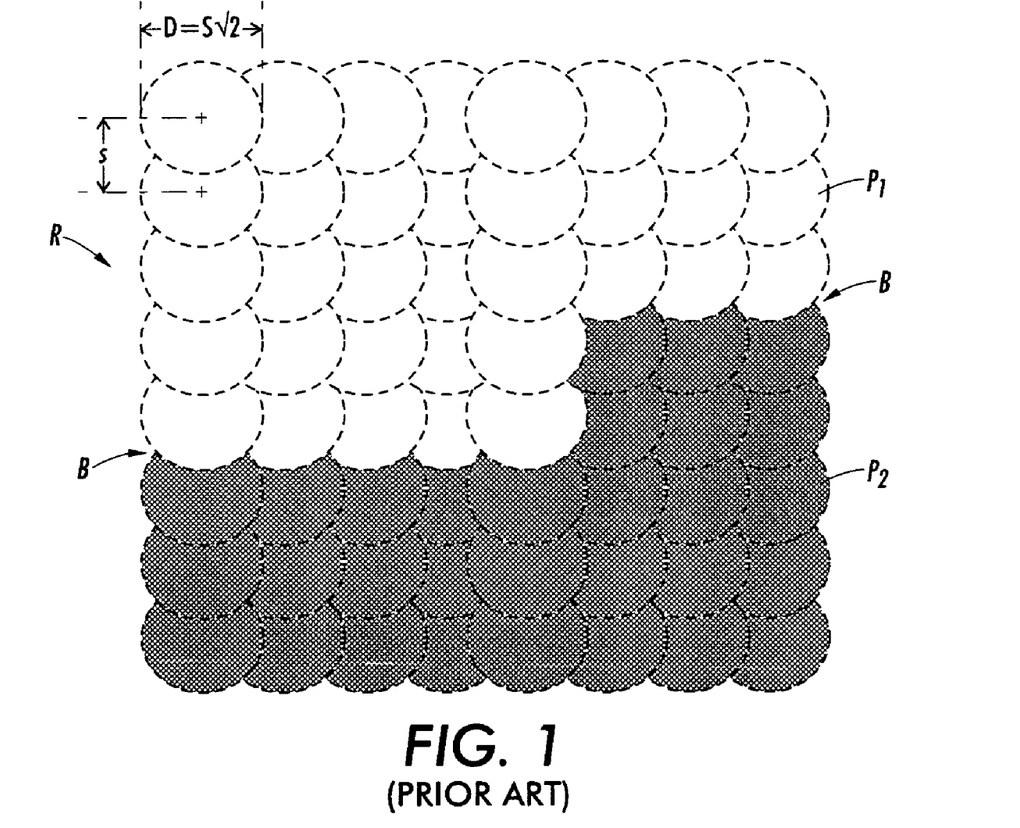
FIG. 1 illustrates a prior art printed image region R having a boundary B between pixels of $P_1$ of a first color and pixels $P_2$ of a second color.

An ink jet printer prints an image by printing a plurality of pixels on a recording medium such as paper or a transparency. The pixels are printed by ejecting drops from the ink jet printheads forming spots also referred to as pixels P on the recording medium as shown in FIG. 1. Adjacent pixels are printed to overlap each other to ensure complete coverage of the printed image region R. The pixels are often printed having a spot size diameter D of approximately the square root of two times the pixel spacing S to ensure overlap of diagonally adjacent printed pixels. At a boundary B between pixels of two colors, P1 and P2, this overlap of different colored printed pixels mixes inks of different colors resulting in the phenomenon known as intercolor bleed.

For color ink jet printers which print on plain paper, one of the challenges is to achieve a proper balance in ink properties which allows penetration into the paper at a sufficiently rapid rate so that pools of different colored inks in adjacent areas do not appreciably intermix.

Intercolor bleed is most noticeable for images which contain sharply defined borders between two patches of ink of different colors. Such patterns frequently occur in business graphics, for example. When intercolor bleed occurs, instead of the desired sharply defined border, the border appears ragged and fuzzy.

For color ink jet printers which print on plain paper, intercolor bleed has been reduced by striving to achieve a proper balance in ink properties which allows penetration into the paper at a sufficiently rapid rate to reduce the pools of different colored inks in adjacent areas thus reducing intermixing. However, the penetration of ink should not occur so rapidly so as to allow edge sharpness to be dominated by a random pattern of paper fibers. Often, the cyan, magenta, and yellow inks are formulated using penetrants or surfactants as constituents to enable penetration into the paper within less than a second, i.e., so that ink at the surface is no longer substantially mobile. For sharp black text and high optical density in black printing, however, it is preferable to formulate the black ink so that it less rapidly penetrates (e.g., penetrates in seconds to tens of seconds). This is called medium dry black ink. Intercolor bleed can be particularly problematic at the boundary between black pixels and pixels of other colors.

Other techniques for reducing intercolor bleed include techniques for altering the image by deleting pixels or printed drops at the borders between colors. This gives the two adjacent patches a relief zone so that wet pools are less likely to come into contact and intermix.

In this regard, several patents teach various pixel modification algorithms to minimize intercolor bleed. For example, U.S. Pat. No. 6,361,144 to Torpey et al. relates to a method for processing color image data to reduce intercolor bleeding in an image printed on a recording medium. U.S. Pat. No. 6,290,330 to Torpey et al. relates to a method of processing color image data for printing in an ink jet printer to maintain edge quality in an image recorded on a recording medium. U.S. Pat. No. 6,183,062 to Curtis et al. provides a method for processing color image data to maintain edge quality in an image recorded on a recording medium. In addition, U.S. Pat. No. 6,343,847 to Torpey et al. relates to a method for processing color image data to determine if a target pixel is within a boundary region near a border.

However, printing algorithms which perform pixel or drop deletion may produce undesirable printing artifacts on certain types of images, such as pictorial images. It has been demonstrated that pixel management algorithms work significantly better for spot sizes corresponding to printing resolutions of 400 spi and above.

In addition, printing using printheads for printing different sized spots is known. For example, U.S. Pat. No. 5,745,131, entitled "Gray Scale Ink Jet Printer" by G. Kneezel, W. Burger, S. Harrington, D. Ims, and J. Stephany, describes a pattern of laying down dots for gray scale in which a first array of ejectors deposits ink spots of a first size on a first grid pattern, and a second array of ejectors deposits ink spots of a second size on a second grid pattern which is offset from the first grid pattern. The two arrays are also fired in time such that placement of the different sized spots is also offset in the scan direction. Other embodiments of this type of printhead are described in U.S. Pat. No. 6,402,280, entitled "Printhead with Close-Packed configuration of Alternating Sized Drop Ejectors" by G. Kneezel, D. Mantell, J. O'Neill, T. Tellier and S. Harrington and U.S. Pat. No. 6,375,294, entitled "Gray Scale Fluid Ejection System With Offset Grid Patterns of Different Size Spots" by G. Kneezel.

For some ink jet printers, printhead operating temperatures can affect the size of the ejected ink drops and thus the spot size diameter D. During operation, the printhead typically heats up, increasing the size of the ink drops ejected from printhead nozzles thereby producing larger spots on the recording medium. U.S. Pat. No. 6,422,677, entitled "Thermal Ink Jet Printhead extended droplet volume control" by N. Deshpande, et al. teaches pre-pulsing the nozzle heaters to keep spot size constant as printhead temperature varies.

However, these techniques of printing different drop sizes (and others), do not address the problem of intercolor bleed in a region of a printed image having a border between two colors.

BRIEF DESCRIPTION

A system and method using pixel spot size control for reducing intercolor bleed is provided.

The method can be a method for reducing intercolor bleed in an ink jet printing process including, printing pixels having a first spot size in an image region having a boundary between a first color portion and a second color portion of the image by ejecting first sized ink drops from the printhead nozzles, and printing border pixels having spot sizes smaller than the first spot size in the image region by ejecting smaller ink drops from the printhead nozzles, wherein the smaller ink drops are smaller than the first sized ink drops.

The system can include an ink jet printer including means for printing pixels having a first spot size in an image region having a boundary between a first color portion and a second color portion of the image by ejecting first sized ink drops from the printhead nozzles, and means for printing border pixels having spot sizes smaller than the first spot size in the image region by ejecting smaller ink drops from the printhead nozzles, wherein the smaller ink drops are smaller than the first sized ink drops.

The system can include a printing system including means for using pixel spot size control for reducing intercolor bleed.

Further scope of the applicability of the embodiments provided herein will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DETAILED DESCRIPTION

A system and method is provided for reducing intercolor bleeding, also referred to as intercolor bleed, that occurs at the boundary, also referred to as the edge or interface, between areas printed with different color inks. The different color inks can have substantially different properties such as dry time or permeability. Intercolor bleed often occurs at the edge between areas of black and areas of other colors as many ink jet printers combine a slow-drying black ink with fast-drying color inks. The black ink often has a drying time in seconds to tens of seconds while the color inks are fast dry inks typically drying in less than one second. However, it is noted that the embodiments are not limited to operating at black and other color edges and may be adapted to reduce intercolor bleed occurring at the edge between areas printed with color inks having substantially different properties. Accordingly, unless stated otherwise, the term "color" as used herein, such as for example in "an image region having a boundary between a first color portion and a second color portion of the image", can include black as well as other colors.

Figure 2:
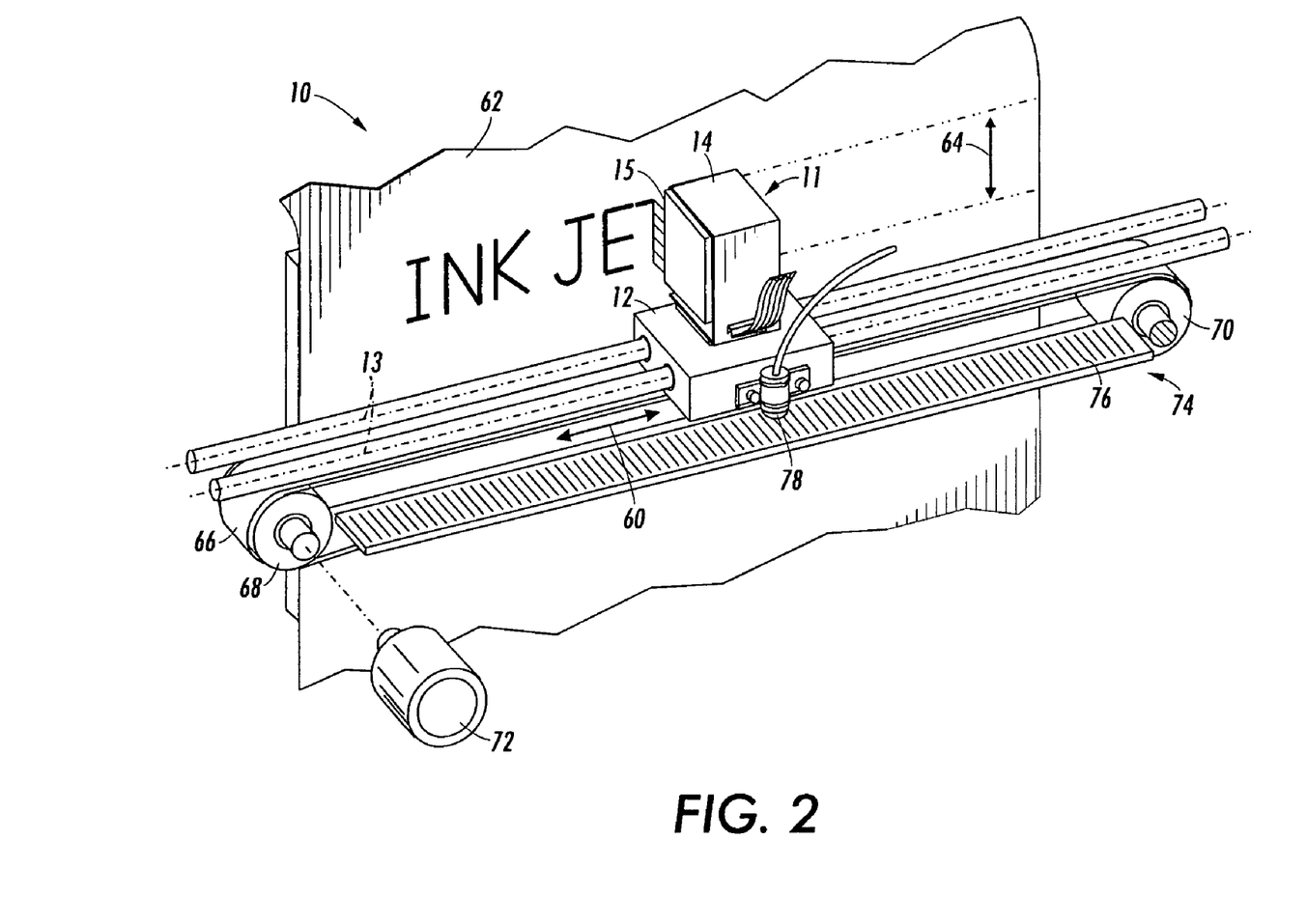
FIG. 2 is a partial schematic perspective view of an ink jet printer incorporating the embodiments described herein.

FIG. 2 illustrates a partial schematic perspective view of an example of an ink jet printer 10 into which embodiments may be incorporated, though other suitable ink jet printing systems can be used. The printer 10 includes an ink jet printhead system 11 mounted on a carriage 12 supported by carriage rails 13. The printhead system 11 includes a housing, or housings, 14 containing ink for supply to a thermal ink jet printhead, or printheads, 15 which selectively expel drops of ink under control of electrical signals received from a controller as described below. In a color printer the printhead(s) 15 can include a black ink printhead and a color ink printhead.

Figure 3:
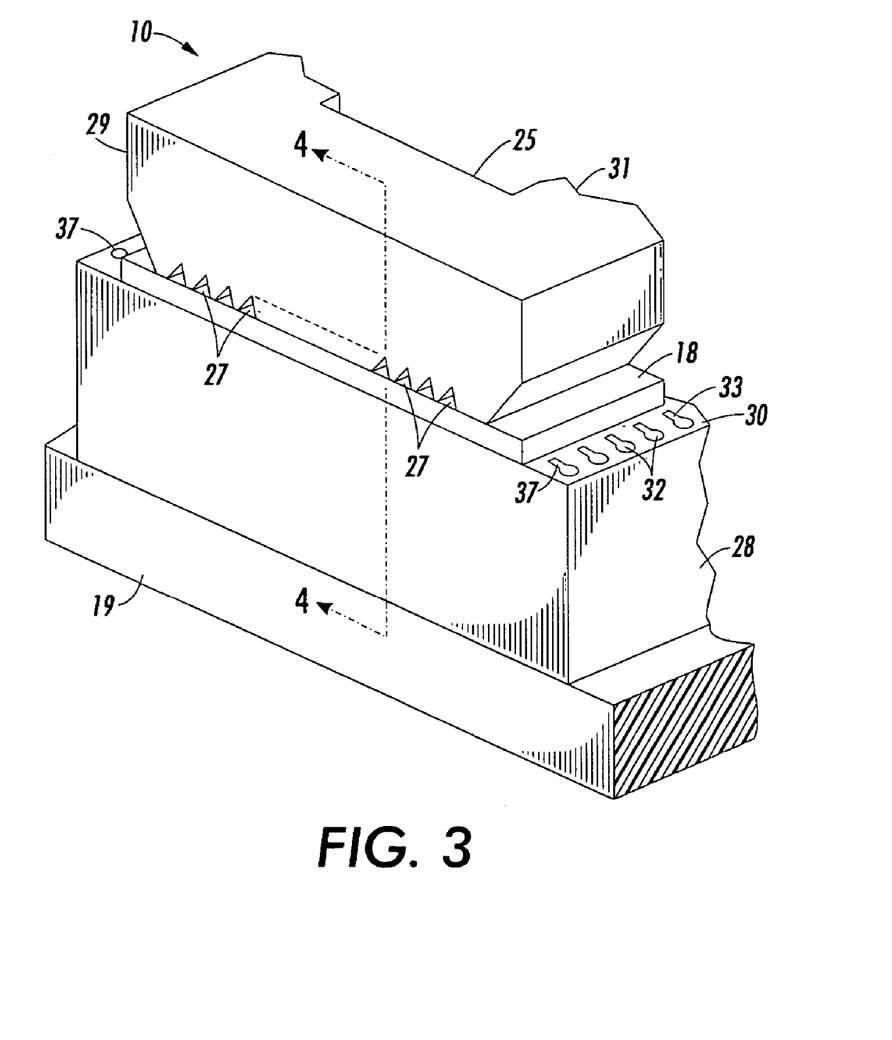
FIG. 3 is a schematic diagram of a portion of a printhead having nozzles for ejecting a drop of ink to print a pixel.
Figure 4:
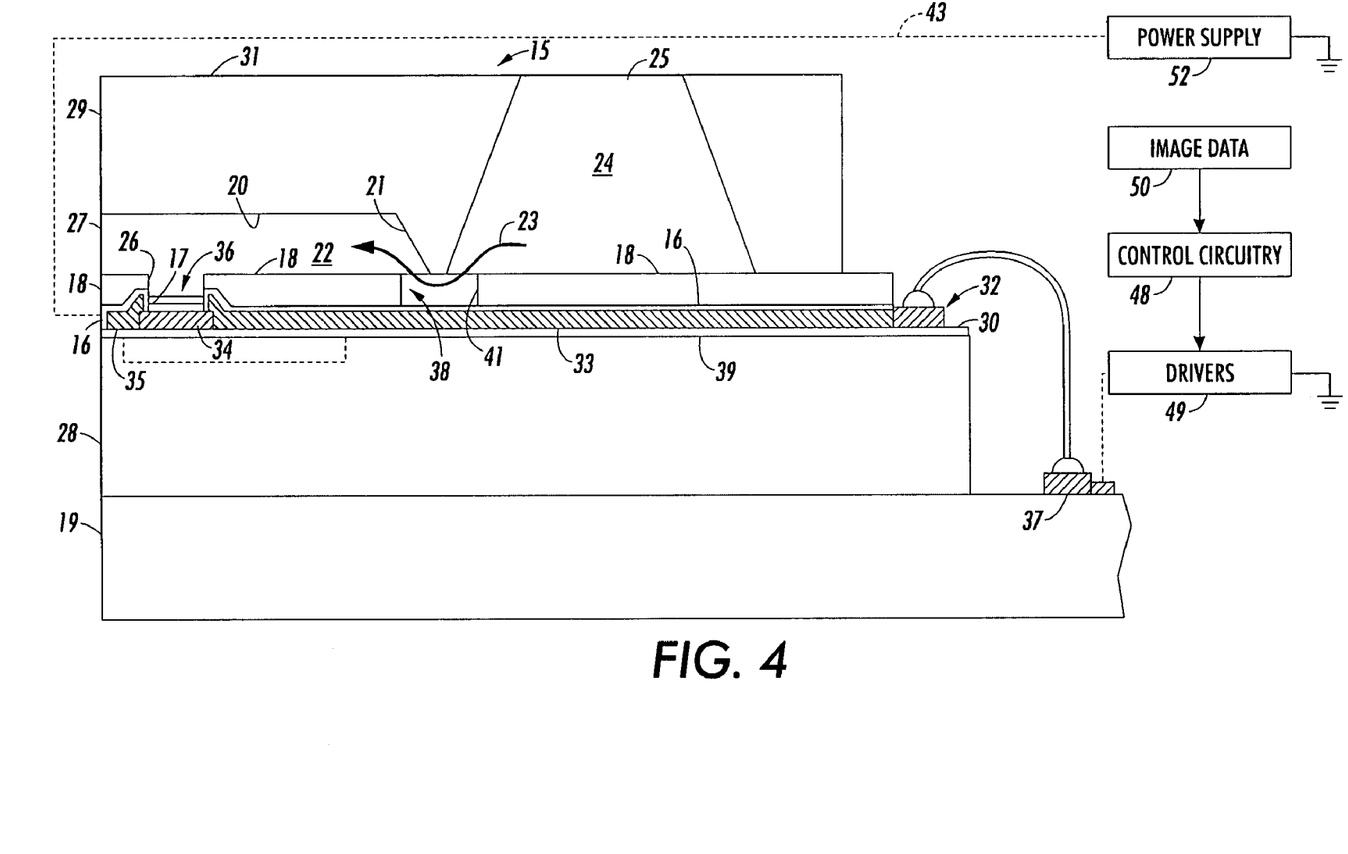
FIG. 4 is a sectional view of a the printhead along line 4-4 in FIG. 3 illustrating a printhead nozzle for ejecting a drop of ink to print a pixel.

An enlarged, schematic isometric view of the front face 29 of an example of a typical thermal ink jet printhead 15 having an array of droplet emitting nozzles 27 is depicted in FIG. 3, though other suitable ink jet printheads can be used. Referring also to FIG. 4 illustrating a sectional view of FIG. 3 taken along 4-4 through one channel and one nozzle 27, a lower electrically insulating substrate or heating element plate 28 has multi-layered thermal transducers 36. The thermal transducers 36 include heating elements 34 and addressing electrodes 33 patterned on surface 30 of plate 28. An upper substrate or channel plate 31 has parallel grooves 20 which extend in one direction and penetrate through the upper substrate front face edge 29 forming an ink channel 22 extending to the nozzle 27. The other end of grooves 20 terminate at slanted wall 21. An internal recess 24, which is used as the ink supply manifold for the capillary filled ink channels 22, has an open bottom 25 for use as an ink fill hole.

The surface of the channel plate 31 with the grooves 20 is aligned and bonded to the heater plate 28, so that a respective one of the plurality of heating elements 34 is positioned in each channel 22, formed by the grooves 20 and the lower substrate or heater plate. Ink enters the manifold formed by the recess 24 and the lower substrate 28 through the fill hole 25 and, by capillary action, fills the channels 22 by flowing through an elongated recess 38 formed in the thick film insulative layer 18. The ink at each nozzle 27 forms a meniscus, the surface tension of which, together with the slight negative pressure of the ink supply, prevents the ink from weeping therefrom. The addressing electrodes 33 on the lower substrate or channel plate 28 terminate at terminals 32. Although the configuration shown in FIG. 4 shows an addressing electrode proceeding directly from heating element 34 to wire bond terminal 32, it is also possible to integrate the drivers 49 and at least some of the control circuitry 48 onto heater plate 28. In such an integrated circuitry ink jet printhead, the drivers 49 and control circuitry 48 would be located between heating element 34 and terminals 32. The upper substrate or channel plate 31 is smaller than that of the lower substrate in order that the electrode terminals 32 are exposed and available for wire bonding to the electrodes 37 on the daughter board 19, on which the printhead 10 is permanently mounted. Layer 18 is a thick film passivation layer sandwiched between upper and lower substrates. This layer 18 is etched to expose the heating elements 34, thus placing them in a pit 26, and is etched to form the elongated recess 38 to enable ink flow between the manifold 24 and the ink channels 22. In addition, the thick film insulative layer 18 is etched to expose the electrode terminals 34.

The ink flows from the manifold 24 and around the end 21 of the groove 20 and into the channel 22 as depicted by arrow 23. The ink droplets are ejected from the nozzles 27 by electrical pulses, referred to as firing pulse signals S3, applied to the heating elements 34 by corresponding drivers 49. The firing pulse signals S3 heat the heating elements 34 which heat the ink in channel formed by recess 20 to substantially simultaneously vaporize the ink. An expanding bubble forces a droplet of ink out of the nozzle 27. After the firing signal S3 is concluded, the heating element 34 is no longer heated and the bubble collapses. The entire bubble formation/collapse typically occurs in about 30μ seconds.

An example of a control system 48 suitable for controlling the embodiments described herein is shown in FIG. 4. The control circuitry 48 can be apart from the printhead(s) 15, or some or all of the control circuitry can be located at the printhead(s), or even integrated into the heater plate 28 as mentioned above. As described in further detail below, the firing pulses S3 are created by the control circuitry 48 which apply signals to the drivers 49 corresponding to the heating elements 34 of the nozzles 27 that are to eject the ink drops in response to the receipt of image data 50 to be printed. The nozzles 27 can be similarly sized each having similar sized openings. For the example of S=1/300 inch, the nozzles 27 can be about 40 μm to 50 μm wide at their largest point, though any suitable size can be used.

Referring again to FIG. 2, the carriage 12 reciprocates or scans back and forth along the carriage rails 13 in the directions of the arrow 60 when printing. As the printhead system 11 reciprocates back and forth across a recording medium 62 such as a sheet of paper or transparency, the droplets of ink are expelled from selected ones of the printhead nozzles towards the sheet of paper 62 The ink nozzles 27 are typically arranged in a linear array perpendicular to the scanning direction 60. During each pass of the carriage 12, the recording medium 62 is held in a stationary position. At the end of each pass, however, the recording medium 62 is stepped by a stepping mechanism under control of the printer controller in the direction of an arrow 64. For a more detailed explanation of the printhead and printing thereby, refer, for example, to U.S. Pat. No. 4,571,599 and U.S. Pat. No. Reissue 32,572, which are incorporated herein by reference.

The carriage 12 is moved back and forth in the scanning directions 60 by a belt 66 attached thereto. The belt 66 is driven by a first rotatable pulley 68 and a second rotatable pulley 70. The first rotatable pulley 68 is, in turn, driven by a reversible motor 72 under control of the controller 48 of the ink jet printer 10 in addition to the toothed belt/pulley system for causing the carriage 12 to move. It is also possible to control the motion of the carriage 12 by using a cable/capstan, lead screw or other mechanisms as known by those skilled in the art.

To control the movement and/or position of the carriage 12 along the carriage rails 13, the printer includes an encoder having an encoder strip 74 which includes a series of fiducial marks in a pattern 76. The pattern 76 is sensed by a sensor 78, such as a photodiode/light source attached to the printhead carriage 12. The sensor 78 includes a cable 80 that transmits electrical signals representing the sensed fiducial marks of the pattern 76 to the printer controller 48.

The printhead(s) 15 have similarly sized drop ejectors also referred to as nozzles or jet nozzles 27 within a single printhead die, as shown in FIG. 3. The print information output to each printhead(s) 15 is loaded by a shift register (not shown) resident in the printhead. An example of such a shift register and appropriate printhead electronics for use in the embodiments described herein is described in U.S. Pat. No. 5,300,968 to Hawkins, herein incorporated by reference. When the loading of the print data to the printhead(s) 15 is complete, the information is latched, and drive signals are sent to the drivers 49 corresponding to the nozzles 27 which are to eject ink while the next row of print data is being loaded into the printhead(s) 15.

Figure 5:
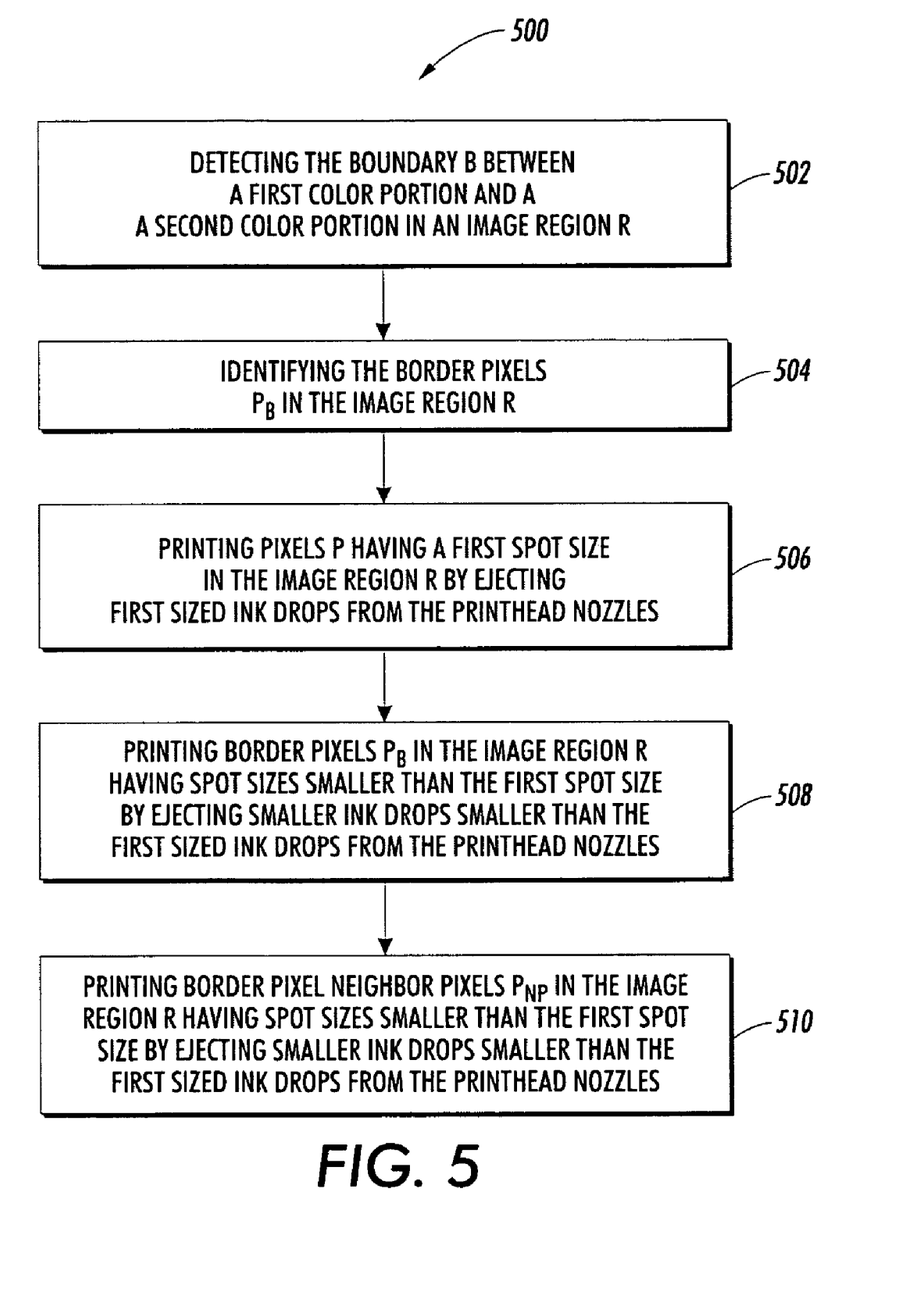
FIG. 5 is a flow chart illustrating a method of reducing intercolor bleed.

It has been found that ink drop size control can be used in an ink jet printing process to reduce the effects of intercolor bleed at the boundary B between printed pixels of a first color P1 and printed pixels of a second color P2 in a printed image region R. FIG. 5 illustrates a method according to the presently described embodiments. This method is implemented in the present system in the form of software that controls the controller 48 (FIG. 4). Of course, such software may take a variety of forms and, in implementation, may also utilize a variety of hardware elements within the printer, some of which are shown in FIG. 2. In addition, any such software may be centralized in the controller 48 or may be distributed within the system. For example, portions of the software method described may be housed within the image processor of the system.

Referring to FIG. 5, a method of reducing intercolor bleed in an ink jet printing process utilizing similarly sized printhead nozzles is shown generally at 500. The method 500 includes detecting the boundary B between a first color portion and a second color portion in an image region R at 502. The boundary B can be detected in any suitable known manner, such as for example in a manner as taught by U.S. Pat. No. 6,183,062 which is incorporated herein by reference and/or U.S. Pat. No. 6,361,144 which is incorporated herein by reference.

The method 500 also includes identifying the border pixels $P_B$ in the image region R at 504. The border pixels $P_B$ in the image region R can be identified in any suitable known manner such as for example as taught by above referenced U.S. Pat. Nos. 6,183,062 and 6,361,144. The border pixel neighbor pixels $P_{NP}$ can be identified in a similar manner or can be identified as those pixels in close proximity to the border pixels $P_B$.

The method 500 also includes printing pixels P at 506 having a first spot size, also referred to as a first spot size diameter $D_1$, in an image region R having a boundary B between a first color portion and a second color portion of the image by ejecting first sized ink drops from the printhead nozzles 27.

The method 500 also includes printing border pixels $P_B$ at 508 having spot sizes smaller than the first spot size $D_1$ in the image region R by ejecting smaller ink drops from the printhead nozzles 27. The smaller ink drops are smaller than the first sized ink drops. The border pixels $P_B$ can have the same spot sizes or different spot sizes. Some of the border pixels $P_B$ can have spot sizes similar to the first spot size.

The method 500 can also include printing border pixel neighbor pixels $P_{NP}$ at 510 having spot sizes smaller than the first spot size $D_1$ in the image region R by ejecting smaller ink drops from the printhead nozzles 27. The smaller ink drops are smaller than the first sized ink drops. The border pixel neighbor pixels $P_{NP}$ pare pixels that are in close proximity to the border pixels $P_B$, examples of which can include pixels adjacent to the border pixels and/or pixels that adjacent to the pixels that are directly adjacent to the border pixels $P_B$, etc. The border pixel neighbor pixels $P_{NP}$ can have the same spot sizes or different spot sizes. Some of the border pixel neighbor pixels $P_{NP}$ can have spot sizes similar to the first spot size.

Figure 6:
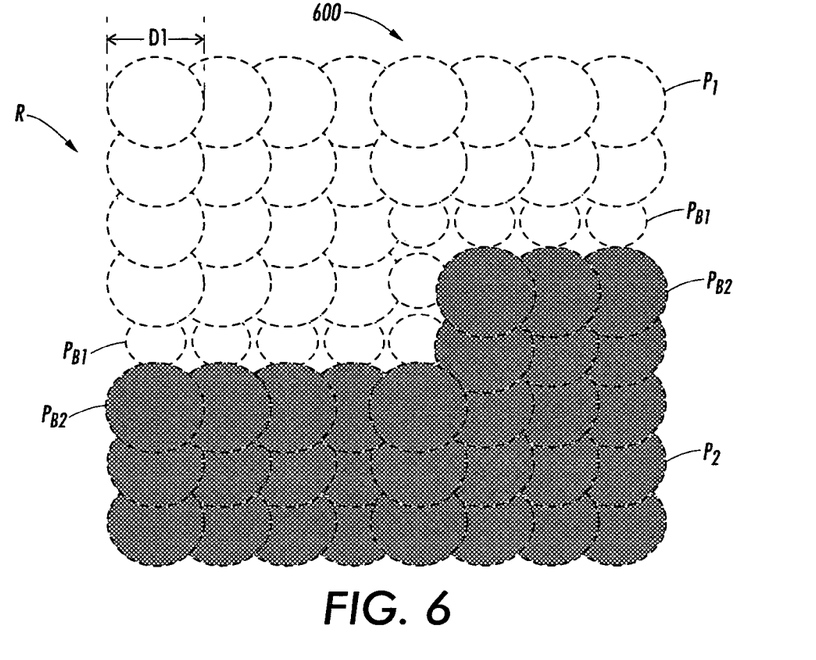
FIG. 6 illustrates an first example of printing border pixels of a first color $P_{B1}$ smaller than the other pixels in the image region R by ejecting smaller drops from the corresponding printhead nozzles to reduce intercolor bleed.

Referring now to FIG. 6, an example of a printed image region R is shown generally at 600 in which ink jet ink drop size control was used to reduce intercolor bleed. The image region R was printed by printing pixels P at 506 having a first spot size $D_1$ in the image region R having a boundary B as described above by ejecting first sized drops from the printhead nozzles 27. The pixels P printed with the first spot size include pixels of a first color $P_1$ and pixels of a second color $P_2$. The first or second color can include black. In the embodiment shown in FIG. 6, border pixels of a first color $P_{B1}$ are printed at 508 having spot sizes smaller than the first spot size $D_1$ in the image region R by ejecting smaller drops which are smaller than the first sized drops from the printhead nozzles 27. The border pixels of the first color $P_{B1}$ can have the same spot size or different spot sizes. In this embodiment, the border pixels of the second color $P_{B2}$ are printed having the first spot size $D_1$ by ejecting first sized drops from the printhead nozzles 27.

Figure 7:
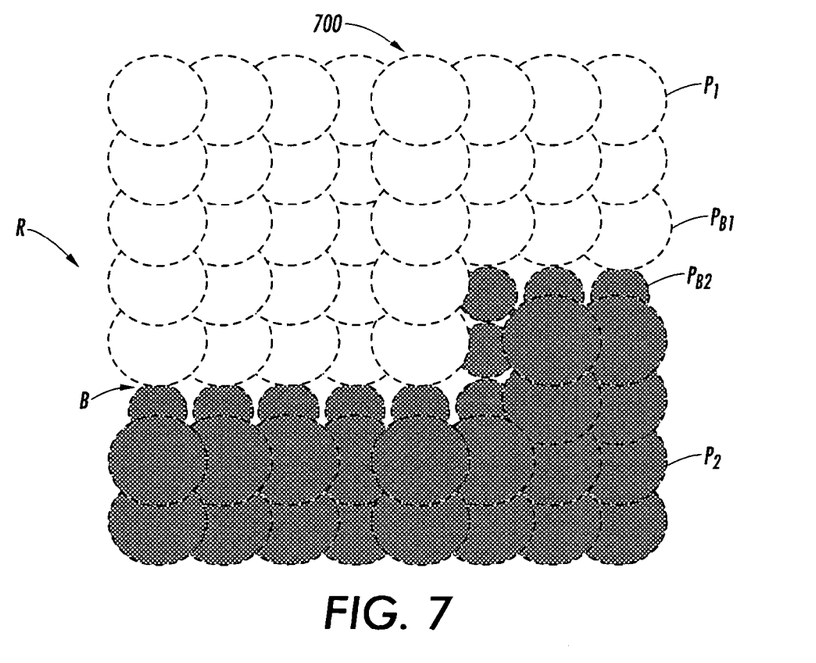
FIG. 7 illustrates a second example of printing border pixels of a second color $P_{B2}$ smaller than the other pixels in the image region R by ejecting smaller drops from the corresponding printhead nozzles to reduce intercolor bleed.

Referring to FIG. 7, another embodiment of a printed image region R is shown generally at 700. The image region R was printed by printing pixels P at 506 having a first spot size $D_1$ in the image region R having a boundary B as described above by ejecting first sized drops from the printhead nozzles 27. The pixels P printed with the first spot size include pixels of a first color $P_1$ and pixels of a second color $P_2$. In this embodiment, the border pixels of the second color $P_{B2}$ are printed at 508 having spot sizes smaller than the first spot size $D_1$ in the image region R by ejecting smaller drops which are smaller than the first sized drops from the printhead nozzles 27. The border pixels of the second color $P_{B2}$ can have the same spot size or different spot sizes. In this embodiment, the border pixels of the first color $P_{B1}$ are printed having the first spot size $D_1$ at 506 by ejecting first sized drops from the printhead nozzles 27.

Figure 8:
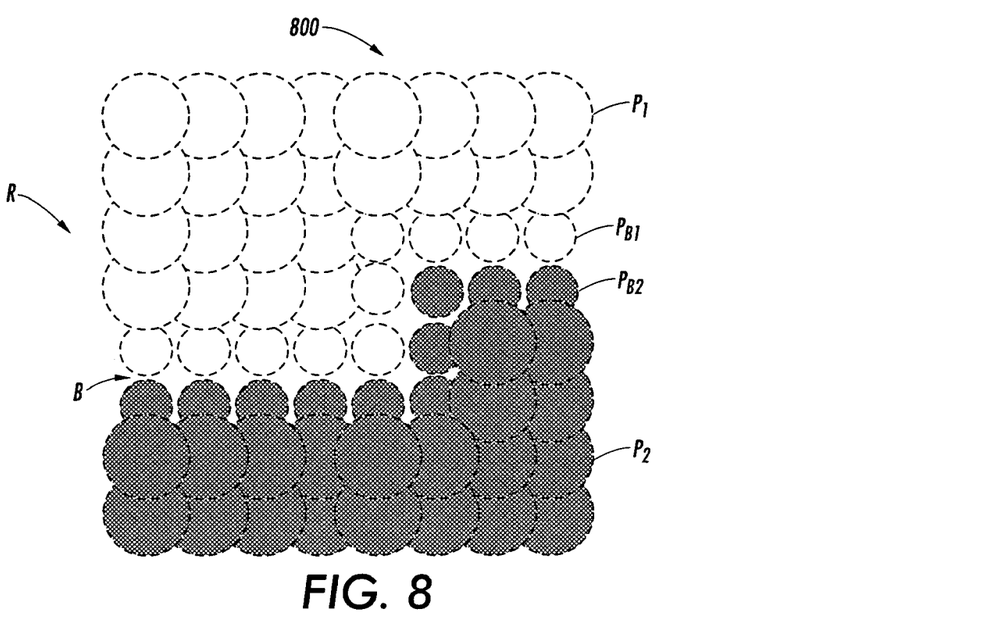
FIG. 8 illustrates another example of printing border pixels of the first color $P_{B1}$ and border pixels of the second color $P_{B2}$ smaller than the other pixels in the image region R by ejecting smaller drops from the corresponding printhead nozzles to reduce intercolor bleed.

Referring to FIG. 8, another embodiment of a printed image region R is shown generally at 800. The image region R was printed by printing pixels P at 506 having a first spot size $D_1$ in the image region R having a boundary B as described above by ejecting first sized drops from the printhead nozzles 27. The pixels P printed with the first spot size include pixels of a first color $P_1$ and pixels of a second color $P_2$. In this embodiment, the border pixels of the first color $P_{B1}$ and the border pixels of the second color $P_{B2}$ are printed at 508 having spot sizes smaller than the first spot size $D_1$ in the image region R by ejecting smaller drops which are smaller than the first sized drops from the printhead nozzles 27. The border pixels $P_{B1}$ and $P_{B2}$ can have the same spot size or different spot sizes.

Figure 9:
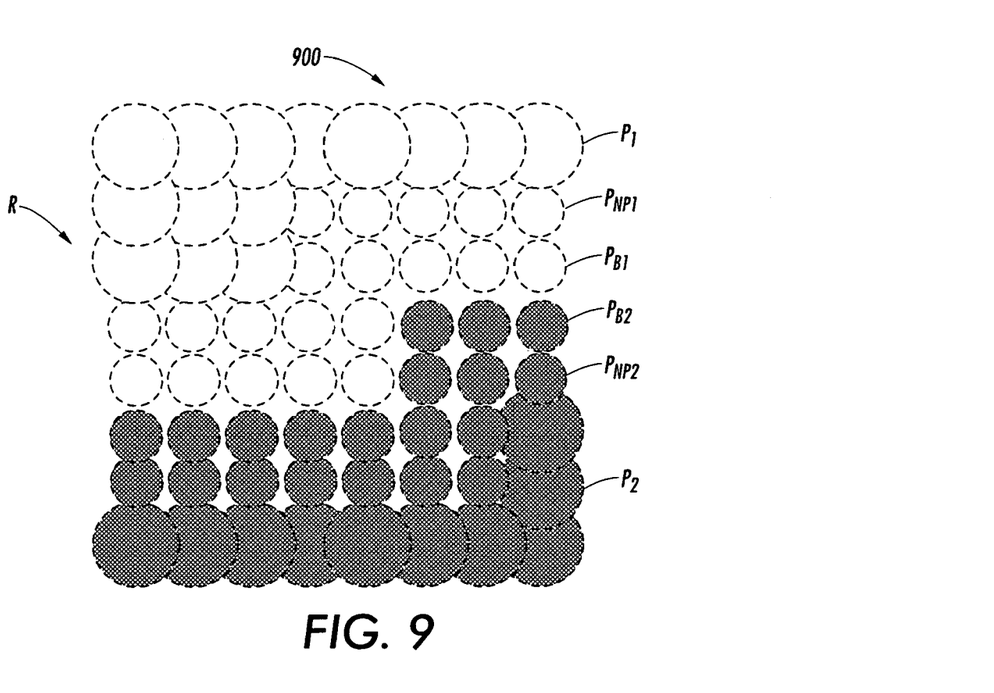
FIG. 9 illustrates another example of printing border pixels of the first and second colors $P_{B1}$ and $P_{B2}$ as well as border pixel neighbor pixels $P_{NP1}$ and $P_{NP2}$ of one or both colors smaller than the other pixels in the image region R by ejecting smaller drops from the corresponding printhead nozzles to reduce intercolor bleed.

Referring to FIG. 9, another embodiment of a printed image region R is shown generally at 900. The image region R was printed by printing pixels P at 506 having a first spot size $D_1$ in the image region R having a boundary B as described above by ejecting first sized drops from the printhead nozzles 27. The pixels P printed with the first spot size include pixels of a first color $P_1$ and pixels of a second color $P_2$. In this embodiment, one or more of the pixels in close proximity to the border pixels $P_B$, referred to herein as border pixel neighbor pixels $P_{NP}$, are printed at 510 having spot sizes smaller than the first spot size $D_1$ in the image region R by ejecting smaller drops which are smaller than the first sized drops from the printhead nozzles 27. The border pixel neighbor pixels $P_{NP}$ can include pixels of a first color $P_{NS1}$ and/or pixels of a second color $P_{NS2}$.

By having a lower ink volume over a longer range, the pool from the solid areas of the first color within the vicinity of the border B has a wider relief zone to spill into before mixing with the neighboring color. In addition, by shrinking the pixels only near the border B, most spots are kept at full size so that the overall optical density is kept at the required high level. Pixel shrinking may not be used at the borders between printed areas and non-printed areas because the smaller pixels bordering a white area would give a scalloped edge appearance.

Spot size control can be achieved using a printing algorithm for pixel shrinking at the border B between different colors to reduce intercolor bleed. In the example provided herein, pre-pulsing is used to reduce intercolor bleed, though any suitable spot size control method can be used to print border pixels $P_B$ and border pixel neighbor pixels $P_{NP}$ having spot sizes smaller than the first spot size $D_1$ by ejecting smaller drops which are smaller than the first sized drops from the printhead nozzles 27.

Typically in a thermal ink jet printhead 15, multiple jet nozzles 27, also referred to as channels 22, are fired at once each printing a pixel P simultaneously in order to improve printing throughput. In this pre-pulsing example, some of the jet nozzles 27 to be fired at any given instant can be at a color boundary B, while others are not. The heaters 34 corresponding to the jet nozzles 27 printing at least some of the pixels $P_B$ at the color boundary receive no pre-pulse signal, while the heaters 34 corresponding to the other nozzles 27 receive a pre-pulse signal. All of the heaters 34 corresponding to the nozzles 27 to be fired simultaneously then receive the firing signal S3 after a waiting period shown as $S_2$.

Figure 10A:
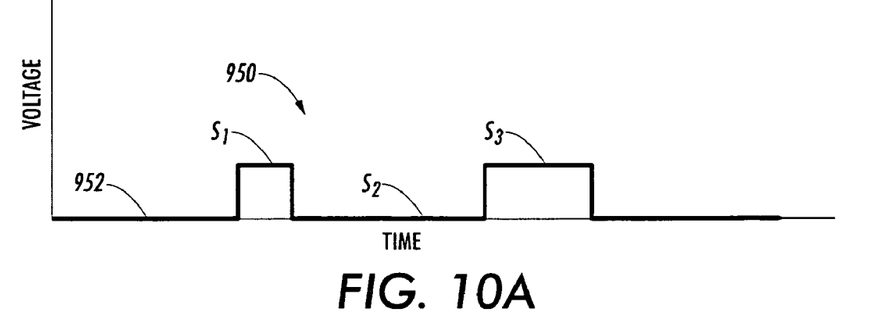
FIG. 10a illustrates a pulse train for pre-pulsing ink jet nozzle heaters.
Figure 10B:
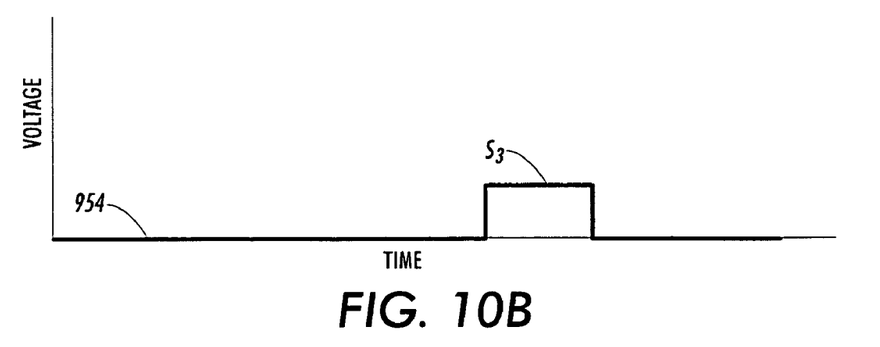
FIG. 10b illustrates a pulse train for firing ink jet print nozzles.

Referring now to FIGS. 10a and 10b, the signal pulses are applied to the nozzle heaters 34 for the nozzles 27 to simultaneously print a group of pixels with the printhead(s) 15. A first pulse train 952 is applied by control circuitry 48 to the drivers 49 of the nozzle heaters 34 of the nozzles 27 which are to print pixels P having the first spot size $D_1$. A second pulse train 954 is applied by control circuitry 48 to the drivers 49 of the nozzle heaters 34 of the nozzles 27 which are to print pixels having spot sizes that are smaller than the first spot size, such as nozzles printing border pixels $P_B$ and border pixel neighbor pixels $P_{NP}$.

The first pulse train 952 includes a pre-pulse signal S1 that is used to heat the ink locally in the thermal ink jet channel 22 using the corresponding heater 34. S1 is short enough that the heater 34 temperature does not rise to the point where bubbles are nucleated, and thus no ink drops are ejected from the nozzle 27. The first pulse train 952 also includes a time period $S_2$ after the pre-pulse signal S1 during which no pulse occurs. The first pulse train 952 also includes a firing signal S3 which is applied to the nozzle heaters 34 of the nozzles ejecting ink drops for printing a pixel P. The second pulse train 954 includes the firing signal S3 but no pre-pulse signal S1. The firing signals S3 from both pulse trains 952 and 954 are applied simultaneously to all the nozzles 27 which are to simultaneously print a pixel. The firing signal S3 is long enough to nucleate a bubble and eject an ink drop from the nozzle 27. Typically, over the operating range, the longer the pre-pulse signal S1 is, the larger the ink drop that will be ejected by the corresponding ink jet nozzle 27 during the firing signal S3.

Pre-pulsing the nozzle heaters 34 of the nozzles 27 which are to print the pixels at 506 having the larger first spot size $D_1$ causes the nozzles to eject the larger first sized ink drops when the firing signal S3 is applied than nozzles which do not receive a pre-pulse signal. The nozzle heaters 34 of the nozzles 27 which are to print the border pixels $P_B$ at 508 and border pixel neighbor pixels $P_{NP}$ at 510 having smaller spot sizes do not receive a pre-pulse signal and therefore these nozzles eject smaller ink drops which are smaller than the first sized ink drops when the firing signal S3 is applied. Although in this example the smaller drops are printed with zero pre-pulse, optionally the smaller size drops may be produced, for example, using a smaller (but nonzero) pre-pulse than is used for printing the larger first spot size $D_1$.

Figure 11:
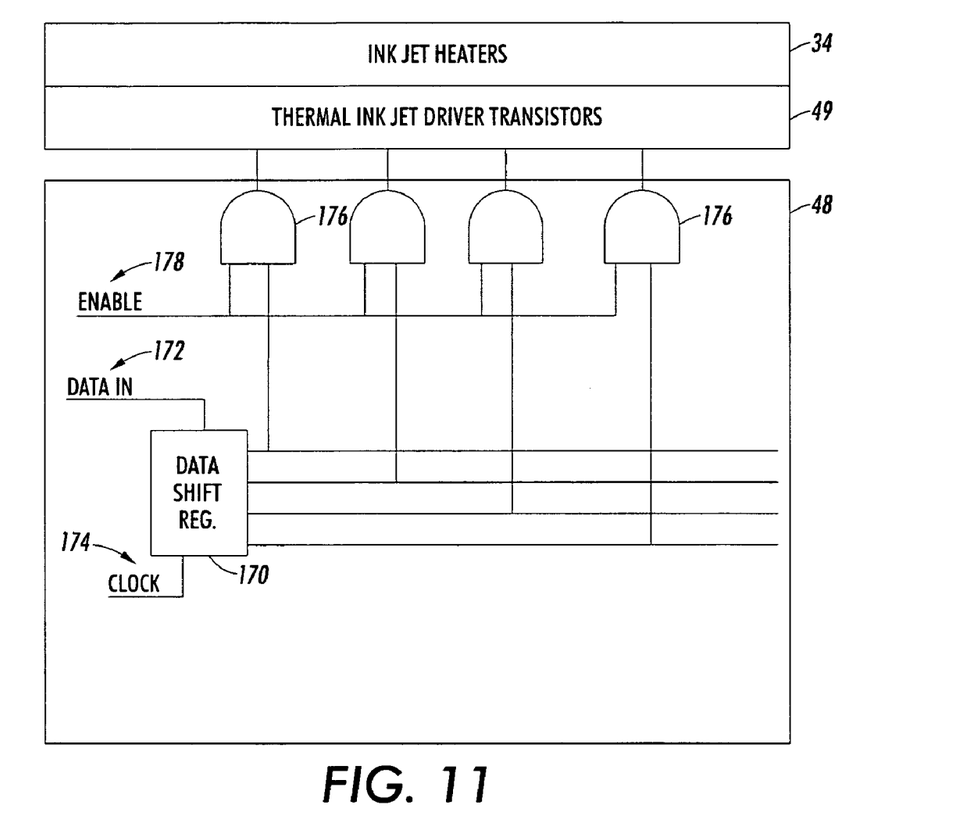
FIG. 11 is a block diagram of a portion of the control circuitry for pre-pulsing ink jet nozzle heaters.

The pulse trains 952 and 952 can be generated in the control circuitry 48 using the circuit configuration shown in FIG. 11 which includes a data shift register 170 receiving print data at the DATA IN input 172. The print data is input serially using the CLOCK signal 174. The output of the data shift register 170, corresponding to each separate driver 49 driving each separate nozzle heater 34 is fed to the inputs of two input AND gates 176. An ENABLE signal 178 is also fed to the inputs of the AND gates 176 to output the signals S1 and S3 described above.

In the example provided, 4 pixels are printed simultaneously, though any suitable number can be printed in this manner. In this example, four bits of print data are loaded for every nibble printed. To produce pixels of two different sizes within a nibble, eight bits of data are loaded for every nibble printed. The eight bits would be composed of four bits of pre-pulse (S1) data: p1, p2, p3, and p4; and four bits of main pulse, also known as the firing pulse, (S3) data: m1, m2, m3 and m4, with 1-4 each corresponding to a separate nozzle heater 34. Any of the nozzles within a bank of four can be pre-pulsed or not pre-pulsed, in any combination regardless of the bit pattern being printed.

For example, suppose a color boundary B exists such that at a particular instant it is desired to print small pixels from jet nozzles 27 #1 and #2, while printing a larger pixel from jet nozzle #3, and no pixel at all from jet nozzle #4. In this case, print data applied to the shift register 170 would be <p1, p2, p3, and p4>=<0,0,1,0> and <m1, m2, m3 and m4>=<1,1,1,0> to produce a pulse train having no pre-pulse similar to 954 applied to the drivers 49 corresponding to jet nozzles 1 and 2, and a pulse train similar to 952 having an appropriate pre-pulse signal S1 is used for the driver 49 of jet nozzle 3. The main firing signal S3 would be applied to the drivers 49 of jet nozzles 1, 2 and 3 to print pixels from these jet nozzles 27. No firing signal S3 is applied to the driver 49 of jet nozzle 4. The widths of S1 and S3 can be controlled by the width of the pulses applied to the ENABLE signal 178.

Figure 12:
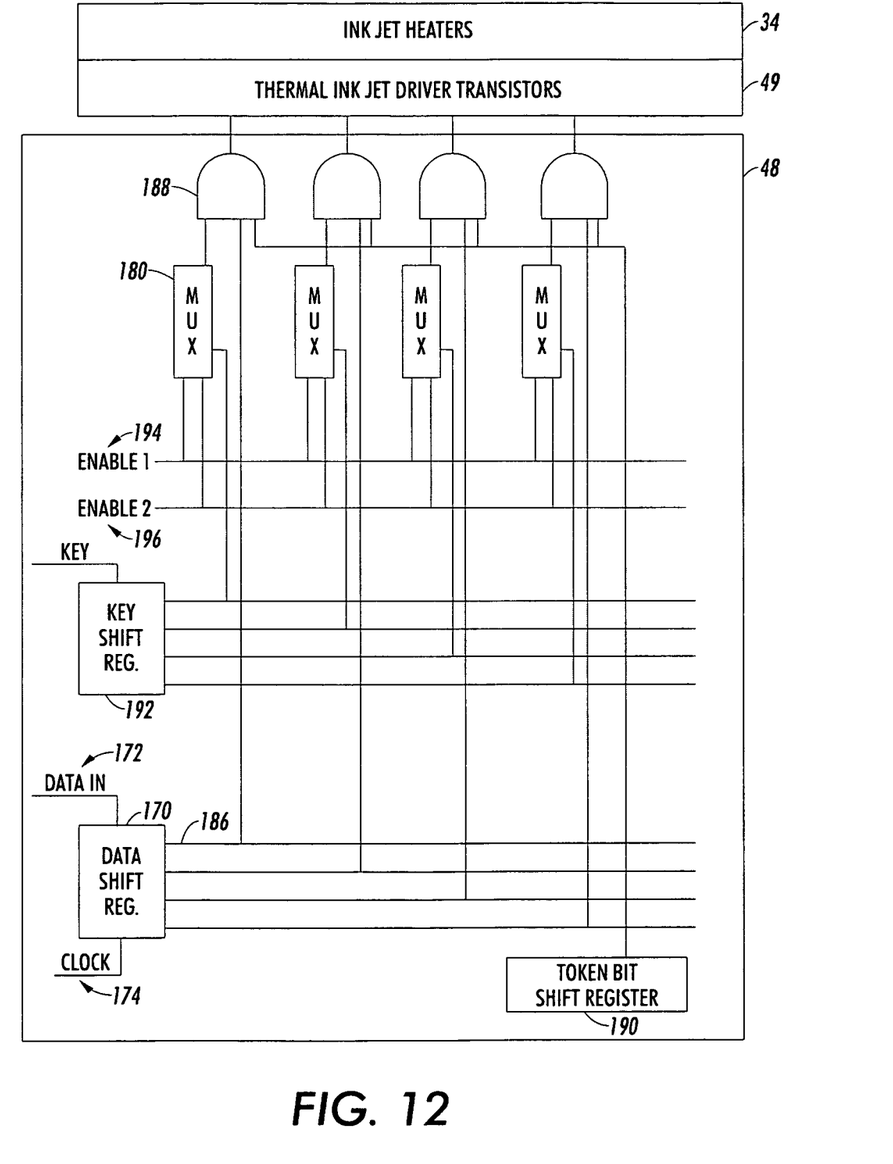
FIG. 12 is a block diagram of a portion of the control circuitry for pre-pulsing ink jet nozzle heaters.

It is also possible to provide two pre-pulses of different durations and/or two firing pulse signals of different durations, referred to herein as different pulsewidths, to the same bank of simultaneously fired nozzles 37 via the drivers 49. FIG. 12 illustrates an example in which the control circuitry 48 includes multiplexers 80 that are used to select between two available pulsewidths. The two different pulsewidths are determined by ENABLE1 194 and ENABLE2 196 signals. Thus, some jet nozzles 27 can be given a pre-pulse $S1_a$ and other jet nozzles can be given pre-pulse $S1_b$. Using different pre-pulse signals in this manner can result in printing two sizes of at least some of the border pixels $P_B$ and/or border neighbor pixels $P_{NP}$ both of which can be smaller than the pixels P having a first spot size $D_1$. Further, two different firing pulse signals $S3_a$ and $S3_b$ can also be used within the group of simultaneously fired jets.

In the example of FIG. 12, four jets may be fired at a time. Four bits of data to be printed as dots are clocked into the input DATA IN 172 of a 4 bit print data shift register 170. The outputs of the shift register 170 are connected to one input of 3-input AND gates 188, each corresponding to a separate nozzle heater 34. A single bit called the token bit is shifted into the token bit register 190 which gates one input of the 3-input AND gate 188.

Figure 13:
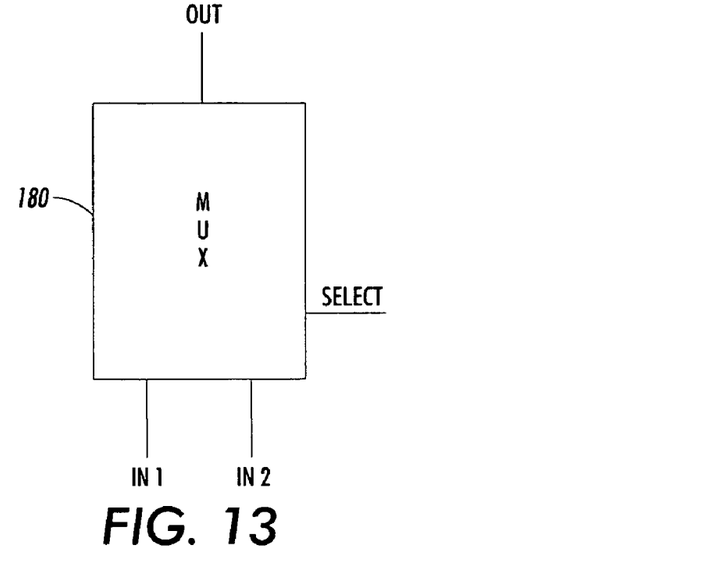
FIG. 13 is a block diagram of a multiplexer used FIG. 12.
Figure 14:
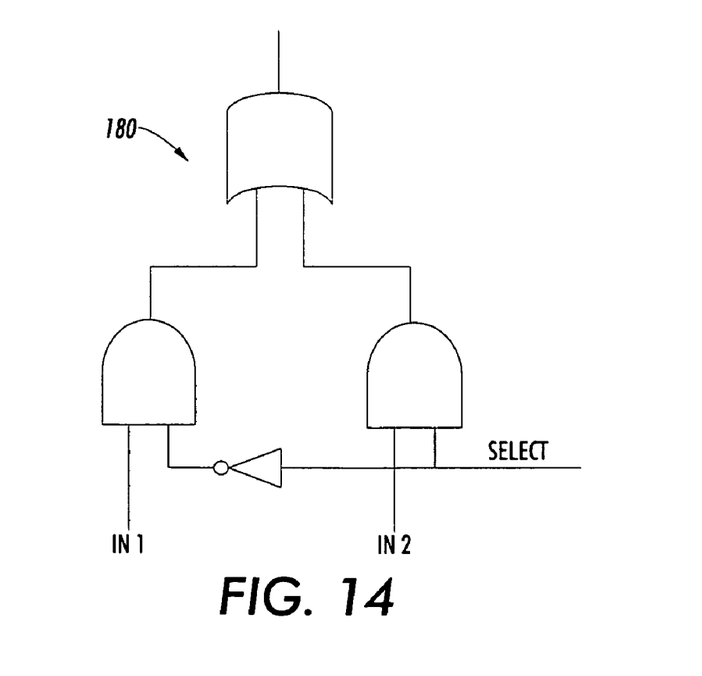
FIG. 14 illustrates the multiplexer of FIG. 13.

Two pulses having different pulsewidths can be provided using a multiplexer (MUX) 180 to pass the selected pulse to the input of the AND gate 188 that is to be used for each jet within the group. Bits are loaded into the Key shift register 192 for selecting which of the pulsewidths are passed by the multiplexer 180, with a 0 selecting one pulsewidth and a 1 selecting the other. The multiplexer circuits 180 are shown schematically in FIGS. 13 and 14.

The disclosure has been described with reference to the preferred embodiments. Obviously, modifications and alterations will occur to others upon reading and understanding the preceding detailed description. It is intended that the embodiments described herein be construed as including all such modifications and alterations insofar as they come within the scope of the appended claims or the equivalents thereof.

What is claimed is:

1. A method for reducing intercolor bleed in an ink jet printing process, the method comprising:
   printing first color pixels P1 and second color pixels P2 having a first size in an image region having a boundary between a first color portion formed of pixels P1 and a second color portion formed of pixels P2 by ejecting first sized ink drops from the printhead nozzles; and
   printing border pixels at the boundary, the border pixels being the first color and being adjacent pixels of the second color and having a size smaller than the first size by ejecting smaller ink drops from printhead nozzles, wherein the smaller ink drops are smaller than the first size ink drops and the first color is different from the second color.

2. The method defined in claim 1 further comprising:
   detecting the boundary; and
   identifying the border pixels.

3. The method defined in claim 1 wherein the step of printing border pixels comprises printing first color border pixels having a size smaller than the first size by ejecting smaller ink drops from the printhead nozzles, wherein the smaller ink drops are smaller than the first sized ink drops, and printing second color border pixels having sizes equal to the first size by ejecting first sized ink drops from the printhead nozzles.

4. The method defined in claim 1 wherein the step of printing border pixels further comprises printing first color border pixels and second color border pixels having sizes smaller than the first size by ejecting smaller ink drops from the printhead nozzles, wherein the smaller ink drops are smaller than the first size ink drops.

5. The method defined in claim 1 wherein the step of printing border pixels comprises printing black border pixels.

6. The method defined in claim 1 further comprising printing border pixel neighbor pixels adjacent the border pixels by ejecting smaller drops from the printhead nozzles, wherein the smaller drops are smaller than the first size drops.

7. The method defined in claim 1 wherein the ink jet printing process is a thermal ink jet process using printhead nozzles having nozzle heaters and further comprising pre-pulsing the nozzle heaters of the printhead nozzles ejecting the first sized drops.

8. The method defined in claim 7 further comprising not pre-pulsing the nozzle heaters of the printhead nozzles ejecting the smaller sized drops.

9. The method defined in claim 7 further comprising:
   pre-pulsing the printhead nozzle heaters without ejecting drops;
   waiting for a period of time; and providing a firing pulse signal to the nozzle heaters of all ink jets simultaneously ejecting drops.

10. The method defined in claim 1 wherein the ink jet printing process utilizes similarly sized printhead nozzles.

11. An ink jet printer comprising:

means for printing first color pixels P1 and second color pixels P2 having a first size in an image region having a boundary between a first color portion formed of pixels P1 and a second color portion formed of pixels P2 by ejecting first size ink drops from printhead nozzles; and means for printing border pixels at the boundary, the border pixels being the first color and being adjacent pixels of the second color and having a size smaller than the first size by ejecting smaller ink drops from the printhead nozzles, wherein the smaller ink drops are smaller than the first size ink drops and the first color is different from the second color.

12. The ink jet printer defined in claim 11 further comprising:

means for detecting the boundary; and means for identifying the border pixels.

13. The ink jet printer defined in claim 11 further comprising means for printing border pixel neighbor pixels by ejecting smaller drops from the printhead nozzles, wherein the smaller drops are smaller than the first sized drops.

14. The ink jet printer defined in claim 11 wherein the means for printing pixels $P_1$ and $P_2$ and the means for printing border pixels further comprise:

printhead nozzles having nozzle heaters.

15. The ink jet printer defined in claim 14 further comprising:

means for pre-pulsing the nozzle heaters of the printhead nozzles ejecting the first sized drops; and means for not pre-pulsing the nozzle heaters of the printhead nozzles ejecting the smaller sized drops.

16. The ink jet printer defined in claim 14 further comprising:

means for pre-pulsing the printhead nozzle heaters during a period without ejecting drops; and means for providing a firing pulse signal to the nozzle heaters of all ink jet nozzles simultaneously ejecting drops.

17. The ink jet printer defined in claim 11 further comprising:

means for providing two different pre-pulse signals having different pulsewidths.

18. The ink jet printer defined in claim 11 further comprising:

means for providing two different firing pulse signals having different pulsewidths.

19. The ink jet printer defined in claim 11 wherein the means for printing pixels of a first color and pixels of a second color and the means for printing border pixels comprise similarly sized printhead nozzles.

20. A printing system comprising:

means for using pixel spot size control for reducing inter-color bleed at a boundary between a first color portion formed of pixels P1 of a first color and a second color portion formed of pixels P2 of a second color different from the first color, the pixels P1 and P2 having a first size, and means for printing border pixels of the first color at the boundary, the border pixels being adjacent pixels of the second color and having sizes smaller than the first size by ejecting smaller ink drops from printhead nozzles.

21. The printing system defined in claim 20 further comprising:

means for printing border pixel neighbor pixels adjacent the border pixels having sizes smaller than the first size by ejecting smaller ink drops from the printhead nozzles, wherein the smaller ink drops are smaller than the first size ink drops.

* * * * *